United States Patent

Dworaczek et al.

[11] Patent Number: 5,255,423
[45] Date of Patent: Oct. 26, 1993

[54] PROCESS FOR INSTALLING A HELICAL ADDED THREAD IN AN INTERNALLY THREADED ORIFICE FOR REPAIRING THE INTERNAL THREADS OF THE ORIFICE

[75] Inventors: Jean P. Dworaczek, Le Breuil; Daniel Grypczynski, Lyons, both of France

[73] Assignee: Framatome, Courbevoie, France

[21] Appl. No.: 772,796

[22] Filed: Oct. 8, 1991

[30] Foreign Application Priority Data

Oct. 8, 1990 [FR] France ............... 90 12363

[51] Int. Cl.$^5$ .................................. B23P 6/00
[52] U.S. Cl. ...................... 29/402.14; 29/402.09; 29/402.17; 29/402.19; 29/456
[58] Field of Search .............. 29/456, 469.5, 890.031, 29/240.5, 402.01, 402.09, 402.14, 402.15, 402.17, 402.19, 525.1; 411/178, 16, 17, 18; 72/117, 122, 123

[56] References Cited

U.S. PATENT DOCUMENTS

| | | | |
|---|---|---|---|
| 2,316,231 | 4/1943 | Evans | 29/456 |
| 2,737,996 | 3/1956 | Toth | 72/117 |
| 2,855,661 | 10/1958 | Forster | 29/240.5 |
| 3,052,972 | 9/1962 | Steinmeyer | 29/240.5 |
| 3,344,501 | 10/1967 | Kulzer | 29/456 |
| 3,348,293 | 10/1967 | Newton et al. | |
| 3,579,793 | 5/1971 | Williams et al. | 29/240.5 |
| 3,602,975 | 9/1971 | Thurston et al. | 29/240.5 |
| 4,099,400 | 7/1978 | Schott | 72/122 |
| 4,843,700 | 7/1989 | Arai | 29/456 |

FOREIGN PATENT DOCUMENTS

| | | |
|---|---|---|
| 469663 | 8/1914 | France . |
| 325916 | 4/1935 | Italy ............... 411/16 |
| 1094772 | 12/1967 | United Kingdom . |
| 1603117 | 11/1981 | United Kingdom . |
| 2202471 | 9/1988 | United Kingdom . |

OTHER PUBLICATIONS

"Heli-Coil System" brochure, Aircraft Screw Products Company, Nov. 1946.

Primary Examiner—P. W. Echols
Assistant Examiner—David P. Bryant
Attorney, Agent, or Firm—Pollock, Vande Sande & Priddy

[57] ABSTRACT

To repair the internal thread (2b) of a large diameter orifice, an added thread is screwed into the orifice in a form wound on a threaded part of the surface of a drum screwed into an internally threaded centering ring engaged in the entry part (2a) of the orifice (2). The thread is laid against the internal thread (2b) and fastened in place by installing a pin passing through the thread and engaged in the wall of the orifice (2). The process is used for repairing the internal threads of orifices (2) machined in the flange of a pressurized-water nuclear reactor vessel, allowing the vessel cover to be bolted down sealingly.

5 Claims, 3 Drawing Sheets

PROCESS FOR INSTALLING A HELICAL ADDED THREAD IN AN INTERNALLY THREADED ORIFICE FOR REPAIRING THE INTERNAL THREADS OF THE ORIFICE

FIELD OF THE INVENTION

The invention relates to a process and a device for installing a helical added thread in an internally threaded orifice of large diameter, for carrying out the repair of the internal thread of the orifice.

BACKGROUND OF THE INVENTION

The vessels of pressurized-water nuclear reactors have an upper flange, to which the cover of the vessel is fastened by means of large-diameter bolts which are screwed into internally threaded orifices machined in the vessel flange and which ensure sealing closure and retention of the cover of the vessel, in which the cooling water of the reactor under very high pressure is circulated while the reactor is operating.

During operations to dismount and refit the cover of the vessel, the internal thread of the orifices of the flange is liable to experience some wear and damage, so that the effectiveness of the clamping of the vessel cover may become inadequate.

Moreover, the screwing of a bolt may be accompanied by seizure within the internally threaded orifice. During screwing, a metal chip torn off from the internal thread of the orifice can form at the thread bottom and block the bolt by seizure.

It is then necessary to sever the bolt and extract it by machining, this operation being very lengthy and difficult to perform.

Processes for repairing the internal thread for an orifice or large diameter when this internal thread has experienced some wear or damage are known.

In particular, it has been proposed to fasten an added helical thread in the orifice.

Patent FR-A-80-01461 describes a process for repairing a large-diameter internal thread, which consists in machining grooves in the wall of the internally threaded orifice and then installing an added thread in the form of a plurality of sectors in the internally threaded orifice. The added thread is mounted on a seat keyed to the bottom of the internal thread, so that the mounting of the added thread does not require the use of special tools. However, this process takes a very long time to perform, thus risking substantially increasing the shut-down time of the nuclear reactor.

A tool making it possible to install an added thread of medium diameter inside an internally threaded orifice is also known. This tool consists of a rod with an actuating handle at its upper end and an axially directed transverse slot at its lower end.

The slot of the tool is capable of interacting with a driving flight of the added thread, in order to introduce this added thread by screwing into the internally threaded orifice which is being repaired.

After complete screwing of the added thread and removal of the tool, the driving flight is broken by using a suitable tool. The added thread is ready to receive an assembly screw or bolt, without the need for any supplementary operation.

Such a tool and the process for using it cannot be applied in the case of an internally threaded orifice of large diameter, the repair of which is carried out by using an added thread.

SUMMARY OF THE INVENTION

The object of the invention is, therefore, to provide a process for installing a helical added thread in an internally threaded orifice of large diameter, for carrying out the repair of the internal thread of the orifice, in which the added thread is introduced into the internally threaded orifice by screwing, this process, simple and quick to carry out, making it possible to obtain and effective and resistant fastening of the added thread, thereby substantially improving the mechanical behavior of the screwed assembly using the internally threaded orifice after its repair.

To this end, the added thread is introduced into the internally threaded orifice in a form wound on a threaded part of the surface of a drum which is screwed into an internally threaded centering ring engaged in the entry part of the internally threaded orifice, so as to constitute an extension of the internal thread of the orifice, the thread is laid against the internal thread and fastened in place by installing a pin passing through the thread and engaged in the wall of the internally threaded orifice.

BRIEF DESCRIPTION OF THE DRAWINGS

To facilitate comprehension of the invention, tools for carrying out the process according to the invention and an embodiment of the process will now be described by way of example with reference to the accompanying drawings, with regard to the repair of the internal thread of an orifice machined in the fastening flange of the cover of the vessel of a pressurized-water nuclear reactor.

DESCRIPTION OF PREFERRED EMBODIMENT

Figure 1:
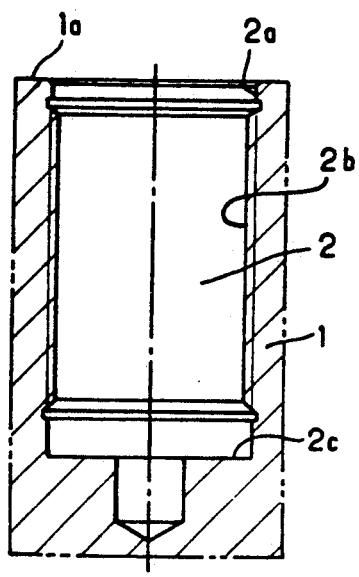
FIG. 1 is a section view, taken in a vertical plane of symmetry, of an internally threaded orifice, machined in the fastening flange of the cover of a vessel of a pressurized-water nuclear reactor.

FIG. 1 shows a part 1 of the upper flange of a vessel of a pressurized-water nuclear reactor, in which is machined an orifice 2 opening onto the upper surface 1a of the vessel flange forming the joining plane of the vessel cover.

The orifice 2 in the form of a blind hole comprises a smooth entry part 2a facilitating the introduction of a clamping bolt, an internally threaded part 2b and a hole bottom 2c forming the end of the bore hole of the vessel flange.

The internal thread 2b of the orifice 2 shows some wear and damage which make it necessary to install an added thread.

Figure 2:
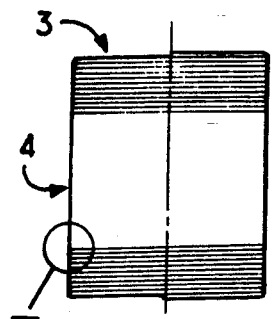
FIG. 2 is a side elevation view of an added thread for repairing the internal thread of the orifice illustrated in FIG. 1.

FIG. 2 illustrates a helical thread 4 which can be used for carrying out the repair of the internal thread 2b of the orifice 2.

As can be seen in FIG. 2, the thread 4 to be added in the orifice 2 is in the form of a helical winding of contiguous turns, the length of which corresponds substantially to the length of the thread of the internal thread 2b to be repaired.

Figure 3:
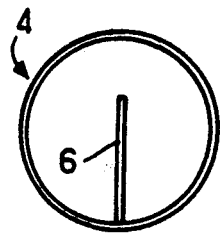
FIG. 3 is a top plan view in the direction of arrow 3 of FIG. 2

FIG. 3 shows that the added thread 4 possesses a lower end flight 6 bent towards the inside in a substantially radial direction.

The thread 4 is produced from a material having a hardness substantially greater than that of the steel of the reactor vessel.

Figure 4:
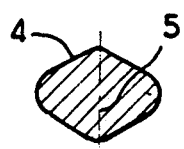
FIG. 4 is a cross-sectional view of the added thread illustrated in FIG. 2.

FIG. 4 shows the cross-section of the thread 4 in the form of a parallelogram with rounded angles, the half-section of the thread, delimited by the axis of symmetry 5, corresponding in form with the space provided between the individual flights of the internal thread 2b.

Figure 5:
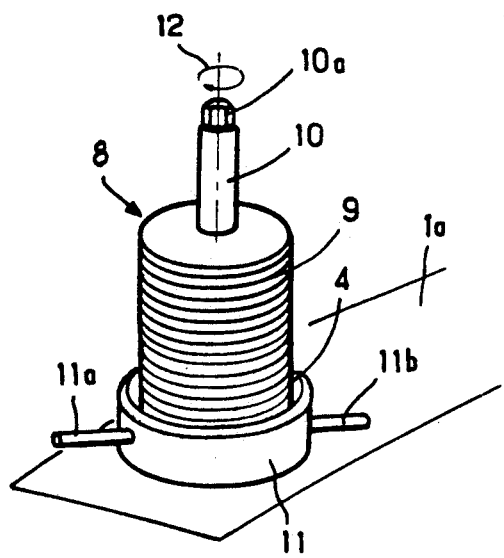
FIG. 5 is a perspective view of a tool allowing the added thread to be centered and introduced into the internally threaded orifice by screwing.

FIG. 5 shows a tool 8 for centering and introducing an added thread 4 in an internally threaded orifice, such as the orifice 2, in the working position on the upper surface 1a of a vessel flange.

The tool 8 comprises a drum 9, on which the thread 4 is wound, a rod 10 fixed to and coaxial with the drum 9, and a centering ring 11 fixed to radially directed holding handles 11a, 11b.

The upper end of rod 30 has a profiled part 10a, on which can be engaged a tool for rotating the rod 10 and the drum 9 about their common axis, as indicated by the arrow 12. The profiled part 10a may advantageously have a prismatic form with a hexagonal base, the rod 10 being driven in rotation by means of a wrench for tightening of a screw or nut.

Figure 6:
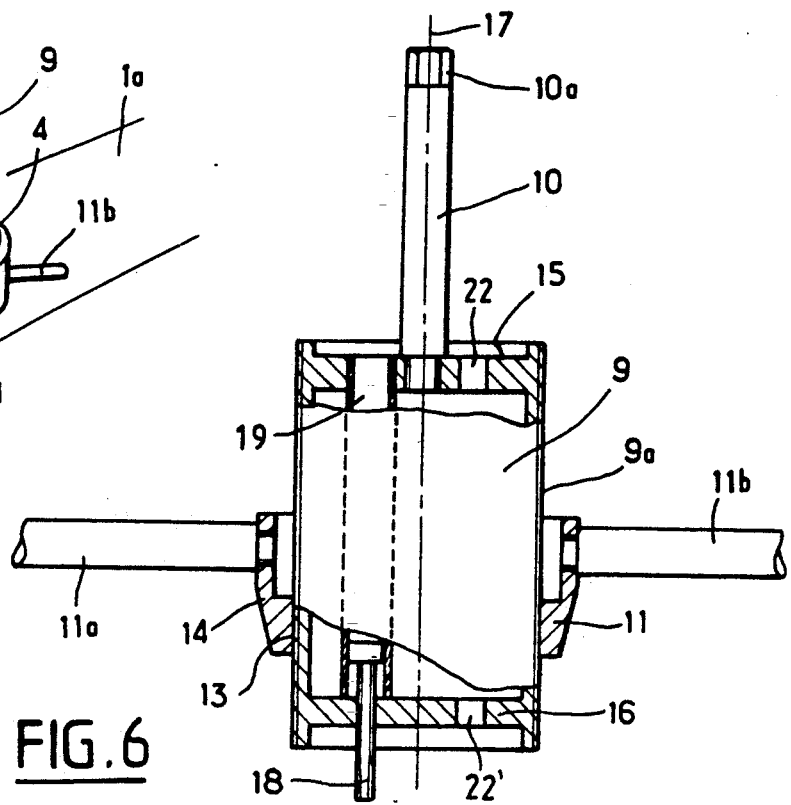
FIG. 6 is a sectional view, taken in a vertical plane of symmetry, of the tool illustrated in FIG. 5.

FIG. 6 shows that the outer surface of drum 9 of the tool 8 has a threading 9a which allows the drum 9 to be engaged inside an internally threaded part 13 of the inner bore of the centering ring 11.

The threading 9a makes it possible to ensure the retention of the added thread 4 on the outer surface of the drum 9, the thread 4 being engaged and wound on the drum 9 before it is introduced into the internally threaded orifice 2.

Furthermore, the threading 9a is truncated, so that the assembly consisting of the drum 9 and of the thread 4 wound on this drum can be screwed into the internal thread 13 of the centering ring 11.

The centering ring 11 has a frustoconical engagement part 14 which can be introduced into the entry part 2a of the orifice 2 and held in position by means of the handles 11a and 11b.

In the engagement position of the centering ring 11, the internal thread 13 takes its place in the extension of the internal thread 2b of the orifice 2.

The drum further comprises an upper bracket 15, to which the rod 10 is fastened, and a lower bracket 16, in which a screw 18 is engaged in a position parallel to the axis 17 of the drum and in an offset position, on the inside of an internally threaded orifice passing through the bracket 16.

To introduce the added thread 4 into the internally threaded orifice 2, the centering ring 11 is placed on the orifice 2, in such a way that its frustoconical end 14 is engaged in the entry part 2a of the orifice 2. An operator keeps the centering ring 11 in place on the entry part of the orifice 2 by means of the handles 11a and 11b. If appropriate, a device for holding the centering ring on the vessel flange, fastened in internally threaded holes adjacent to the orifice 2, can be used.

The drum 9 on which the thread 4 is wound is introduced and screwed into the internally threaded bore 13 of the centering ring 11 which is kept fixed relative to the vessel flange. The drum 9 is screwed by means of the upper end 10a of the rod 10, on which a tool, such as a tightening wrench, is engaged.

During the rotation of the drum, as indicated schematically by the arrow 12 in FIG. 5, the screw 18 comes to bear on the flight 6 at the lower end of the thread 4, to ensure that it is held and driven during the rotation of the drum 9.

The rotation of the drum 9 ensures that the added thread 4 is screwed first into the internally threaded bore 13 of the centering ring 11 and then into the internal thread 2b of the orifice 2 arranged in the extension of the internal thread 13.

The thread 4 is thus engaged progressively into the internal thread 2b of the orifice 2, in such a way that its outer part is introduced into the space provided between the individual flights of the internal thread 2b.

The position of the screw 18 in relation to the bracket 16 is adjusted in such a way that the end of the screw abuts the bottom 2c of the orifice 2 when the added thread 4 is engaged completely inside the internal thread 2b.

The installation of the added thread 4 inside the orifice 2 is thus completed. The screw 18 is displaced in such a way that it no longer comes into engagement with the end flight 6, or the end flight 6 of the added thread 4 is broken by introducing a tool through aligned orifices provided in the plates 15 and 16, and then the drum 9 is extracted from the orifice 2 by setting the drum in rotation in the direction opposite to the screwing. The flight 6, which is no longer driven by the screw 18, remains in place in the orifice 2, the threading 9a of the drum being displaced as a result of sliding on the added thread 4.

If screw 18 is axially displaced in order to cause it to escape from the flight 6, it is possible to use a guide tube 19 for a screwing and unscrewing tool intended to come into engagement with the screw head and arranged in an axial direction within the drum 9. If the flight 6 is broken, orifices such as 22 and 22' are provided for introducing a tool into the orifice 2.

The added thread 4 is subsequently laid in the thread bottom of the internal thread 2b by using the tool illustrated in FIGS. 7, 8A and 8B.

As, shown in these figures, the device 20 comprises, inside a casing 21, a support 23, to the lower part of which is fastened a base 24, making it possible to put the tool 20 in place in a centered position at the entrance of the internally threaded orifice 2 into which the added thread has been introduced.

The support 23 comprises a tubular central part 23a, coaxial with the base 24 and coaxial the internally threaded orifice 2 when the device 20 is in operating position.

Mounted in a coaxial position inside the tubular part 23a of the support is a screw 25 having a tubular shank and meshing with a nut 26 driven in rotation by a pinion 27 mounted on the output shaft of a motor 28 carried by the support 23.

A tube 30 is rotatably and coaxially mounted inside the shank of the screw 25 by means of bearings 31 and has an upper part projecting relative to the upper end of the casing 21.

The tube 30 carries at its lower end, by means of a support 32, the roller assembly 33 of the tool 20 for laying of the added thread inside the internally threaded hole 2.

Roller assembly 33 comprises four rollers, such as the roller 35 mounted rotation about an axle 36 on a support 37 mounted pivotably about an axle 38 on the support 32.

Located coaxially inside the tube 30 is a tubular actuating rod 39 having a lower part connected to the support 37 of the rollers 35 by links 40.

The upper part 41 of the tubular rod 39 is graduated so that it is possible to identify its position in relation to a rotatably mounted knurled nut 42 bearing on the upper end part of the tube 30 and making it possible to displace the rod 39 axially.

The adjusting rod 39 can be displaced by means of the knurled nut 42, in such a way as to ensure radial adjustment of the rollers 35 by means of the links 40. The diametral spacing of the rollers and the pressure laying the added thread inside the internally threaded orifice 2 can thereby be adjusted.

Moreover, the support 23 of the tool carries a motor 44 having an output shaft which carries a driving pinion 45 meshing with a crown gear 46. The tube 30 is mounted inside the crown gear 46, in such a way that it is fixed against rotation relative to the crown gear 46 and movable in axial translation by means of a key 48 engaged in a longitudinal flute 49 machined in the wall of the tube 30.

A longitudinal flute 50 is machined in the wall of the tubular screw 25 and carries a stop 51 intended for interacting with limit contactors 52 and 52' making it possible to limit the axial displacement of the laying tool.

The device 20 also comprises a pneumatic distributor 53 having a control handle located outside the casing 21 and a distributor 53' likewise having a control handle located outside the casing.

The pneumatic distributor 53 makes it possible to ensure control of the pneumatic motor 44, and the distributor 53' ensures control of the motor 28.

Setting the motor 44 in rotation ensures, by means of the pinion 45 and the crown gear 46, that the tube 30 and the roller assembly 33 are set in rotation.

Setting the motor 28 in rotation makes it possible to displace the roller assembly 33 in the axial direction by means of the pinion 27, the nut 26 and the screw 25.

The radial position of the rollers 35 is adjusted by means of the knurled knob 42.

Figure 7:
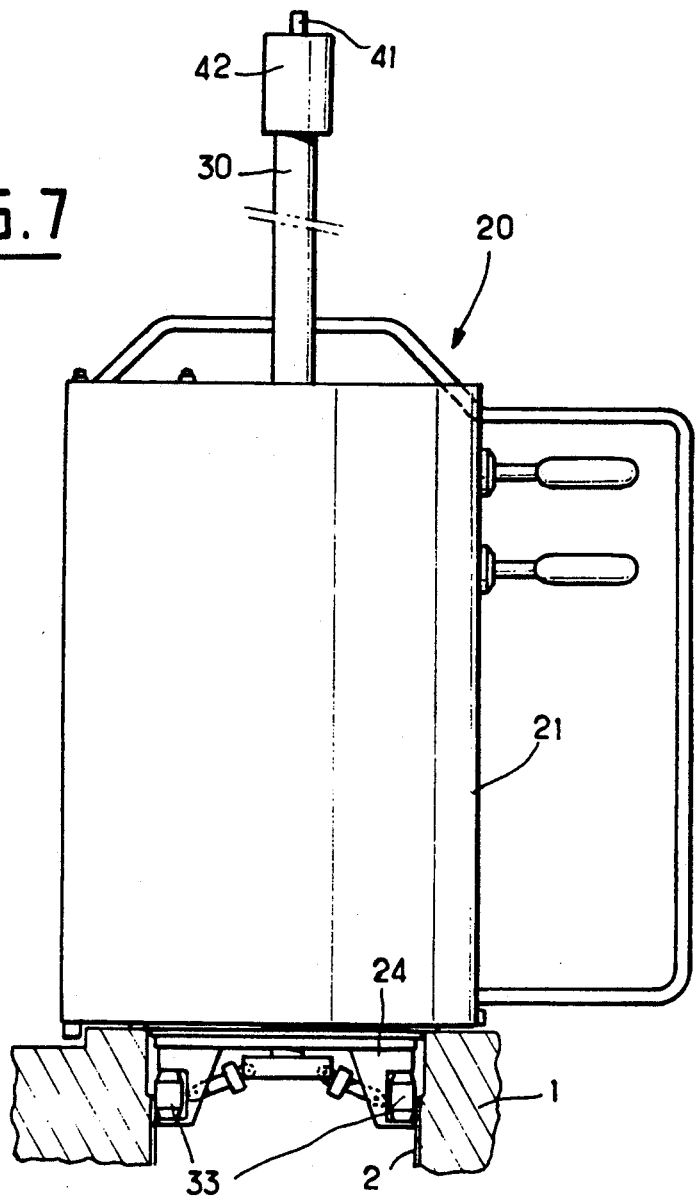
FIG. 7 is a side elevation view of a tool for laying the added thread in the internally threaded orifice.
Figure 8A:
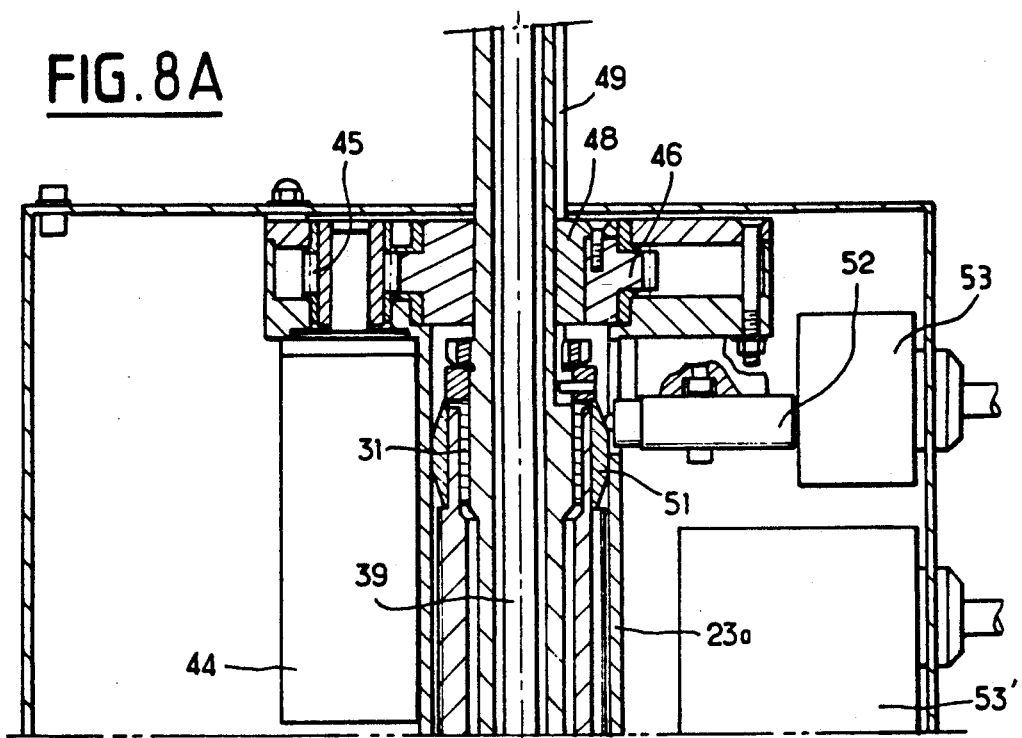
FIGS. 8A and 8B are respectively sectional views, taken in a vertical plane, of the upper and lower parts, respectively, of the tool illustrated in FIG. 7.
Figure 8B:
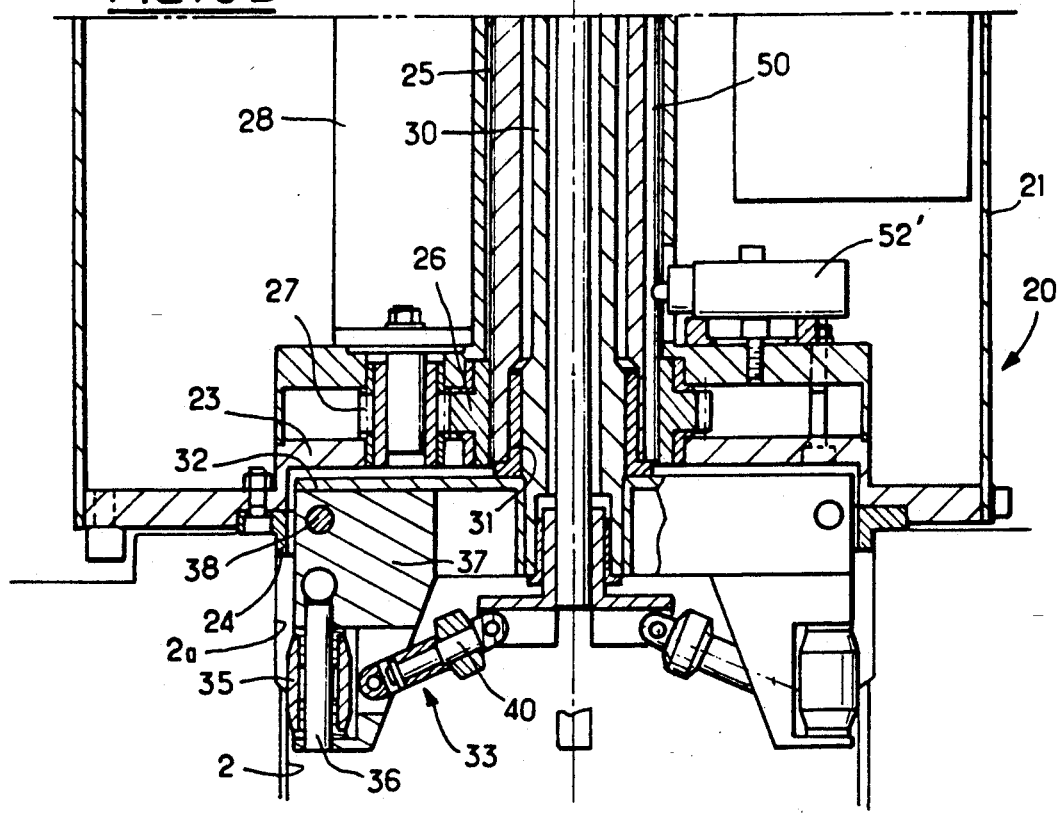

After the added thread has been installed inside the internally threaded orifice 2, as described above, the laying tool 20 is placed at the entry end of the internally threaded orifice 2 in a coaxial arrangement, as shown in FIGS. 7 and 8B.

The roller assembly 33 is in a high position and projects slightly relative to the centering base 24. The rollers take their place inside the entry part of the internally threaded orifice 2, and their radial arrangement is adjusted by means of the knurled nut 42, in such a way that they can effectively lay the added thread on the thread bottom inside the internal thread 2b of the orifice 2. The setting in rotation of the laying tool is controlled by means of the distributor 53.

The descending movement of the roller assembly 33 is controlled by means of the distributor 53'.

The roller assembly 33 is displaced in a helical movement within the orifice 2, so as to carry out the laying of the added thread over its entire length.

When the laying tool has arrived at the lower part of the added thread, the stop 51 actuates the limit contactor 52' in order to stop the descending movement.

The displacement of the roller assembly 33 in the ascending direction is then controlled by means of the distributor 53' by causing it to rotate in the direction opposite to the preceding direction.

The roller tool returns to its high position shown in FIGS. 7 and 8.

Effective laying of the added thread inside the internal thread 2b has thereby been carried out.

Figure 9:
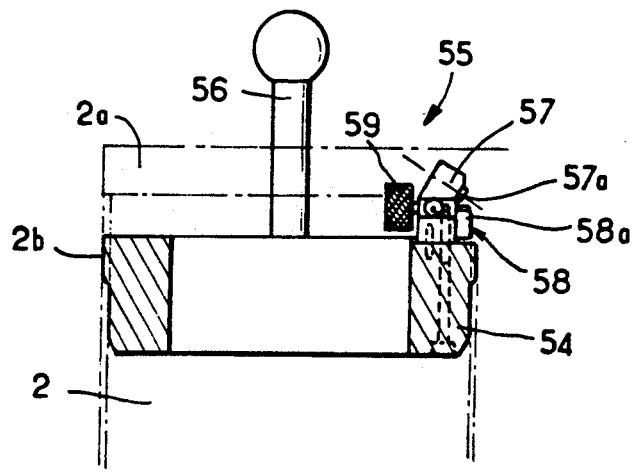
FIG. 9 is a sectional view, taken in a vertical plane, of a tool for boring the added thread and the wall of the internally threaded orifice, in order to install a fastening pin for the added thread.

The laying tool 20 is separated from the flange 1, and a guide device, illustrated in FIG. 9, is placed inside the hole 2, making it possible to bore the end of the added thread and the wall of the internally threaded orifice 2 in a perfectly defined arrangement and orientation.

The guide device 55 shown in FIG. 9 comprises an externally threaded collar 54 fixed to a handle 56.

The external, threading of the collar 54 makes it possible to screw it into the internal thread 2b of the hole 2, in which the added thread has been previously positioned and laid in place.

The upper surface of collar 54 carries a boring bush 57 mounted on a stage 58, of which the radially directed position inside the orifice 2 can be adjusted by means of a knurled knob 59.

To bore the added thread and the wall of the internally threaded hole 2 in a desired position and orientation, the threaded collar 54 is introduced into the hole 2 via its entry end 2a and screwed into the internally threaded part 2b using the handle 56, until the stage 58 and the boring bush 57 are in such a position that the end 58a of the stage 58 faces the upper end of the added thread 4 engaged and laid in place inside the internal thread 2b. The position of the stage 58 and of the boring bush 57 is adjusted by actuating the knurled knob 59, until the end 58a of the stage 58 comes up against the thread 4 which it lays against the internal thread. The boring axis 57a of the bush 57 is then arranged in such a way that boring can be carried out manually by using an independent boring machine.

Figure 10:
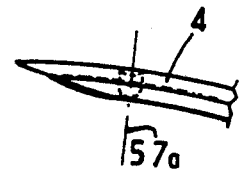
FIG. 10 is a detail view of the end of the added thread in which the fastening pin is engaged.

As can be seen in FIG. 10, a through-bore of the end of the added thread 4 and of the wall of the orifice 2 in its internally threaded part 2b is made along the axis 57a.

A pin of suitable size is introduced into the bore in such a way as to ensure the fastening of the added thread 4 in the internal thread 2b, and is then ground and cut off flush.

The repair of the internal thread of the orifice 2 is thus completed, and therefore this internally threaded orifice can be used for fastening the vessel cover by introducing a bolt having a threaded part of desired form and dimensions into the internal thread, the repair of which has been carried out.

Since the added thread is produced from a material of a hardness substantially higher than the hardness of the component material of the reactor vessel and the bolt, the screwing of the bolt can be carried out without any risk of seizure, the threads in contact sliding perfectly on one another. In the event of damage to a thread, it is sufficient to replace the added thread in the manner described above. The dismounting of the damaged thread can be executed manually without difficultly.

The process according to the invention is simple to carry out and allows a perfectly effective repair to be made.

The installation of the added thread according to the invention therefore makes it possible to reduce considerably the difficulty and length of time of the maintenance operations associated with the dismounting and refitting of the vessel cover and substantially to increase the operating safety of the reactor as a result of a better behavior of the mechanical assembly of the bolt and of the internal thread of the vessel.

Tools other than those described can be used for carrying out the successive operations of introducing, laying and fastening of the added thread.

The added thread can be produced from any material having satisfactory mechanical characteristics, whatever its chemical compatibility with the steel of the vessel and whatever its weldability, in so far as the process according to the invention does not involve any welding or even soldering operation.

Finally, the installation process and device according to the invention can be employed for carrying out the installation of a helical added thread in an internally threaded orifice of large diameter, both within the framework of the repair of a nuclear reactor vessel and for repairing any other nuclear component, or more generally, any component of an industrial installation having internally threaded orifices of large diameter, of which the nominal diameter is, for example, between 150 and 250 mm.

We claim:

1. Process for installing a helical added thread in a large diameter orifice for repairing an internal thread of said orifice, said process comprising the steps of
   (a) providing a cylindrical drum having an at least partly threaded external surface;
   (b) engaging and winding said added thread on a threaded part of said external surface of said drum;
   (c) providing a centering ring having a threaded internal surface and an engagement end part;
   (d) engaging and maintaining said engagement end part of said centering ring in an entry part of said orifice, so that said threaded internal surface of said centering ring constitutes an extension of said internal thread of said orifice;
   (e) screwing said drum on which said added thread is wound onto said threaded internal surface of said centering ring and then into said internal thread of said orifice;
   (f) laying said added thread against said internal thread of said orifice; and
   (g) fastening said added thread in place by passing a pin through the thread and engaging said pin in an internal wall of said orifice.

2. Process according to claim 1, wherein said added thread consists of a material having a hardness substantially higher than the hardness of the material forming said wall of said orifice and of the material of a fastening element to be screwed into said orifice.

3. Process according to claim 1 or 2, wherein said added thread consists of a winding with continuous turns, said winding having the length which corresponds substantially to a length of the thread of said internal thread which is being repaired.

4. Process according to claim 1 or 2, wherein said added thread has an end flight bent towards the inside of said added thread in a substantially radial arrangement.

5. Process according to claim 1 or 2, wherein said thread has a cross-section in the form of a parallelogram with rounded angles.

* * * * *